United States Patent
Virden et al.

(10) Patent No.: US 9,729,200 B2
(45) Date of Patent: *Aug. 8, 2017

(54) POWER LINE NETWORK WITH MULTI-SCHEME COMMUNICATION

(71) Applicant: Landis+Gyr Technologies, LLC, Pequot Lakes, MN (US)

(72) Inventors: Paul Virden, Backus, MN (US); Verne Olson, Pequot Lakes, MN (US); Damian Bonicatto, Pequot Lakes, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,218

(22) Filed: Sep. 13, 2016

(65) Prior Publication Data

US 2017/0005701 A1 Jan. 5, 2017

Related U.S. Application Data

(63) Continuation of application No. 14/718,608, filed on May 21, 2015, now Pat. No. 9,461,707.

(51) Int. Cl.
*H04B 1/16* (2006.01)
*H04B 3/54* (2006.01)
*H04L 25/49* (2006.01)

(52) U.S. Cl.
CPC ............ *H04B 3/542* (2013.01); *H04B 1/16* (2013.01); *H04L 25/4902* (2013.01)

(58) Field of Classification Search
CPC . H04B 1/16; H04B 3/54; H04B 3/542; H04B 2203/5404; H04B 2203/5408;
(Continued)

(56) References Cited

U.S. PATENT DOCUMENTS 5,581,229 A 12/1996 Hunt
6,154,488 A 11/2000 Hunt
(Continued)

OTHER PUBLICATIONS

RFC 6550—"RPL: IPv6 Routing Protocol for Low-Power and Lossy Networks;" Mar. 2012.
(Continued)

*Primary Examiner* — David B. Lugo
(74) *Attorney, Agent, or Firm* — Crawford Maunu PLLC

(57) ABSTRACT

In various embodiments, a power-line communication apparatus provides data over a power-line communication network by transmitting data symbols to endpoint circuits over a power line. The power-line communication apparatus includes a signal-processing circuit configured to combine a plurality of different data streams, each of the plurality of different data streams respectively formatted according to different communication schemes, to form a signal that represents a combination of the different data streams and corresponding communication schemes. Further, the power-line communication apparatus includes a pulse-modulation circuit configured to convert the signals, as combined, as a pulse-width modulated or a pulse-density modulated signal, the pulse-modulation circuit configured to switch at a frequency higher than frequencies of the different communication schemes. An output circuit can be configured to filter the switching frequency and to couple the data symbols to an injector transformer for presentation to the endpoint circuits.

19 Claims, 7 Drawing Sheets

(58) Field of Classification Search
CPC .... H04B 2203/5433; H04B 2203/5466; H04B 2203/5491; H04L 25/4902
See application file for complete search history.

(56) References Cited

U.S. PATENT DOCUMENTS

| | | | |
|---|---|---|---|
| 6,177,884 B1 | 1/2001 | Hunt et al. | |
| 6,998,963 B2* | 2/2006 | Flen | H04B 3/542 340/12.33 |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,187,276 B2 | 3/2007 | Kline | |
| 7,209,840 B2 | 4/2007 | Petite et al. | |
| 7,224,740 B2 | 5/2007 | Hunt | |
| 7,236,765 B2* | 6/2007 | Bonicatto | H04B 3/54 340/12.37 |
| 7,346,463 B2 | 3/2008 | Petite et al. | |
| 7,432,824 B2 | 10/2008 | Flen et al. | |
| 7,443,313 B2 | 10/2008 | Davis et al. | |
| 7,468,661 B2 | 12/2008 | Petite et al. | |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,774,530 B2 | 8/2010 | Haug et al. | |
| 7,791,468 B2 | 9/2010 | Bonicatto et al. | |
| 7,877,218 B2 | 1/2011 | Bonicatto et al. | |
| 7,978,059 B2 | 7/2011 | Petite et al. | |
| 8,144,816 B2 | 3/2012 | Bonicatto et al. | |
| 8,144,820 B2 | 3/2012 | Bonicatto | |
| 8,170,081 B2 | 5/2012 | Forenza et al. | |
| 8,194,789 B2 | 6/2012 | Wolter et al. | |
| 8,213,398 B2 | 7/2012 | Geile et al. | |
| 8,213,582 B2 | 7/2012 | Hurwitz | |
| 8,238,263 B2 | 8/2012 | Kohout et al. | |
| 8,325,693 B2 | 12/2012 | Hazani et al. | |
| 8,855,279 B2 | 10/2014 | Forbes et al. | |
| 9,461,707 B1* | 10/2016 | Virden | H04B 3/542 |
| 2002/0039388 A1 | 4/2002 | Smart et al. | |
| 2002/0141523 A1 | 10/2002 | Litwin, Jr. et al. | |
| 2003/0115391 A1 | 6/2003 | Ajanovic et al. | |
| 2004/0160990 A1 | 8/2004 | Logvinov et al. | |
| 2007/0002772 A1 | 1/2007 | Berkman et al. | |
| 2007/0222579 A1 | 9/2007 | Berkman | |
| 2008/0304595 A1 | 12/2008 | Haug et al. | |
| 2008/0310457 A1 | 12/2008 | Yamashita et al. | |
| 2009/0161774 A1 | 6/2009 | Liu et al. | |
| 2009/0299532 A1 | 12/2009 | Zyren | |
| 2009/0316766 A1 | 12/2009 | Korobkov et al. | |
| 2010/0021166 A1 | 1/2010 | Way | |
| 2010/0164615 A1 | 7/2010 | Bonicatto | |
| 2010/0238815 A1 | 9/2010 | Kohout et al. | |
| 2010/0316140 A1 | 12/2010 | Razazian et al. | |
| 2011/0026621 A1 | 2/2011 | Kim et al. | |
| 2011/0121952 A1 | 5/2011 | Bonicatto et al. | |
| 2011/0142108 A1 | 6/2011 | Agee et al. | |
| 2011/0176598 A1 | 7/2011 | Kohout et al. | |
| 2011/0218686 A1 | 9/2011 | McHann, Jr. et al. | |
| 2011/0249678 A1 | 10/2011 | Bonicatto et al. | |
| 2012/0057592 A1 | 3/2012 | Zeppetelle et al. | |
| 2012/0076212 A1 | 3/2012 | Zeppetelle et al. | |
| 2012/0076228 A1 | 3/2012 | Wu et al. | |
| 2012/0084559 A1 | 4/2012 | Bonicatto | |
| 2012/0106664 A1 | 5/2012 | Bonicatto et al. | |
| 2012/0331509 A1 | 12/2012 | Laksono | |
| 2013/0142231 A1 | 6/2013 | Schwager et al. | |
| 2013/0163681 A1 | 6/2013 | Wolter et al. | |
| 2013/0163683 A1* | 6/2013 | Morris | H04B 3/542 375/257 |
| 2013/0335207 A1 | 12/2013 | Magin et al. | |
| 2014/0064387 A1 | 3/2014 | Bonicatto et al. | |

OTHER PUBLICATIONS

IEEE 802.15.4-2006—"Part 15.4: Wireless Medium Access Control (MAC) and Physical Layer (PHY) Specifications for Low-Rate Wireless Personal Area Networks (WPANs);" 2006.
ITU-T G.9903—"Narrowband orthogonal frequency division multiplexing power line communication transceivers for G3-PLC networks;" Oct. 2012.
USPTO. International Search Report dated Jul. 18, 2016 for counterpart PCT Patent Application No. PCT/US2016/027339.

* cited by examiner

POWER LINE NETWORK WITH MULTI-SCHEME COMMUNICATION

FIELD

Aspects of various embodiments are directed to power-line communication networks delivering data over power-lines using multiple types of signals.

BACKGROUND

The electrical grid delivers electrical power to consumers using an interconnected power network. Power stations/plants produce electricity from a number of different power sources including, but not limited to, combustible fuels, nuclear fission, water, solar energy and wind. Utility power lines deliver the electricity from the power stations to consumer's premises (e.g., customers of the power supply provider), which include residential and commercial buildings. Long distance transmission can be carried out using high voltage alternating current (AC) (e.g., on order of hundreds of kilovolts), which is useful for reducing energy loss. Substations include transformers for reducing the voltage (e.g., under 10,000 volts or under 13,200 volts) for subsequent delivery to a local area. The voltage can be further reduced (e.g., down to 120-280 volts) using a local transformer, sometimes referred to as a transformer drum/can for its traditional drum-like shape or as a pad mount, for delivery to a consumer's premises. For example, in residential circumstances, the voltage can be further reduced down to 240 volts using a local transformer.

Service providers are dependent on proper operation of their respective networks to deliver services to the customers. Often, it can be desirable or necessary to ascertain information regarding the services that are provided. For example, the service provider may want access to daily usage reports to efficiently bill their customers for the resources that are consumed or otherwise utilized by the customers. Therefore, it is important for data specifying resource utilization and other information to be reliably transmitted and/or received at specified intervals.

In power line communication (PLC) networks, data from a power substation (e.g., from the collector/transmitter) can be communicated to the endpoint circuits in the network (e.g., meters, load control switches, remote service switches, and other endpoints) by transmitting data over power lines that also carry alternating current. In some instances, there is no common communication scheme to use to communicate to all endpoint circuits in the PLC network, which poses a challenge for communicating data to the endpoint circuitry. To communicate data to the endpoint circuitry, a different set of electronics could be designed and dedicated for each different communication scheme. However, dedicated sets of electronics can raise concerns in terms of physical space, power consumption, increased heat, and communication interference.

These and other matters have presented challenges to power line communication networks, for a variety of applications.

SUMMARY

Aspects of the present disclosure are directed to power-line communication networks delivering data over power-lines using multiple communication schemes, and that are applicable to a variety of applications, devices, systems and methods. One or more embodiments provide for transmission of a signal that represents a combination of different data streams, each data stream being formatted according to a different communication scheme used for conveying data symbols to endpoint circuits corresponding to a corresponding communication scheme.

Aspects of the present disclosure are directed toward a system with distributed endpoint circuits that communicate with collector circuitry over power distribution lines. Particular embodiments are directed toward a modulation/encoding solution that accounts for communication of data from a power substation to endpoint circuits that correspond to different communication schemes. For example, different data streams formatted according to different communication schemes can be combined for simultaneous transmission. Although not limited thereto, certain aspects of the present disclosure are premised upon the discovery that by combining the data streams, the PLC network can transmit a signal that represents a combination of the different data streams and corresponding communication schemes simultaneously.

According to a number of example embodiments, endpoint circuits are configured to communicate using at least one communication scheme over a power line. In some embodiments, a first subset of endpoint circuits are configured to communicate using a first communication scheme and not configured to communicate using a second communication scheme. A second subset of endpoint circuits are configured to communicate using the second communication, and not configured to communicate using a first and/or third communication. The different communication schemes in the PLC network can occur when an upgrade or new system is deployed and not all of the endpoint circuits are upgraded or for many other reasons, such as different entities sharing the same power lines. Aspects of the present disclosure recognize that not all endpoint circuits in a PLC network are capable of communicating using all of the different communication schemes or using a common communication scheme.

Therefore, as PLC networks are deployed and/or evolve, a PLC network can include endpoint circuits that communicate using multiple different communication schemes. In embodiments, a transmitter may be used to transmit signals to endpoint circuits using the multiple different communication schemes. However, due to space constraints on a power substation, placing two sets of electronics in a single enclosure can be problematic for space and thermal considerations. It has been discovered that a single transmitter can transmit a signal that represents a combination of multiple data streams and corresponding communication schemes over a relatively high bandwidth with high power output as compared to a single signal bandwidth transmitter. Such a transmitter can be used, in various embodiments, to transmit multiple different data streams and corresponding communication schemes to respective endpoints simultaneously.

Certain embodiments are directed to a power-line communication apparatus. The apparatus includes a signal-processing circuit, a pulse-modulation circuit, and an output circuit. The signal-processing circuit is configured and arranged to combine a plurality of different data streams, each of the plurality of different data streams respectively formatted according to different communication schemes used for conveying the data symbols to certain of endpoint circuits of a power-line communication network, to form a signal that represents a combination of the different data streams and corresponding communication schemes. The pulse-modulation circuit is configured and arranged to convert the signal, as combined by the signal-processing circuit, as a pulse-width modulated (PWM) or a pulse-density modulated (PDM) signal, the pulse-modulation circuit configured and arranged to switch at a frequency of not less than 10 kilohertz (KHz). Further, the output circuit is configured and arranged to filter the switching frequency from the PWM or PDM signal and to couple the filtered PWM or PDM signal to an injection transformer for presentation to the endpoint circuits.

Various embodiments are directed to a system. The system comprises a signal-processing circuit, a pulse-modulation circuit, an output circuit, and an injection transformer. The signal-processing circuit is configured and arranged to combine a plurality of different data streams, each of the plurality of different data streams respectively formatted according to different communication schemes used for conveying the data symbols to certain of the endpoint circuits, to form a signal that represents a combination of the different data streams and the corresponding communication schemes. The pulse-modulation circuit is configured and arranged to convert the signal, as combined by the signal-processing circuit, as a pulse-width modulated (PWM) or a pulse-density modulated (PDM) signal, the pulse-modulation circuit configured and arranged to switch at a frequency of not less than 10 KHz. The output circuit is configured and arranged to filter the switching frequency from the PWM or PDM signal and to couple the filtered PWM or PDM signal to an injection transformer for presentation to the endpoint circuits. And, the injection transformer is configured and arranged to couple the filtered PWM or PDM signals to power lines for delivery to the endpoint circuits.

Various embodiments are directed to a method for providing data over a power-line communication network by transmitting data symbols from a power station to endpoint circuits over power lines using communication channels. The method includes combining, by summing, a plurality of different data streams, each of the plurality of different data streams respectively formatted according to different communication schemes used for conveying the data symbols to certain of the endpoint circuits, to form a signal that represents a combination of the different data streams and corresponding communication schemes, and each of the plurality of different data streams respectively corresponding to different carrier frequencies. The method further includes converting the signal, as combined, as a pulse-width modulated (PWM) or a pulse-density modulated (PDM) signal using a pulse-modulation circuit configured and arranged to switch at a frequency of not less than 10 KHz and more than the different carrier frequencies, and filtering the switching frequency from the PWM or PDM modulated signal using a band-pass filter. And, the method includes transmitting the filtered PWM or PDM signal to at least one of three phase lines via an injection transformer for presentation to the endpoint circuits, and transmitting, using the injection transformer, the filtered PWM or PDM signals to the endpoint circuits over (utility) power lines.

The above discussion/summary is not intended to describe each embodiment or every implementation of the present disclosure. These and other aspects of the present disclosure are exemplified in a number of implementations and applications, some of which are described in the accompanying drawings and the description below.

BRIEF DESCRIPTION OF THE FIGURES

Various example embodiments may be more completely understood in consideration of the following detailed description in connection with the accompanying drawings, in which.

Figure 1:
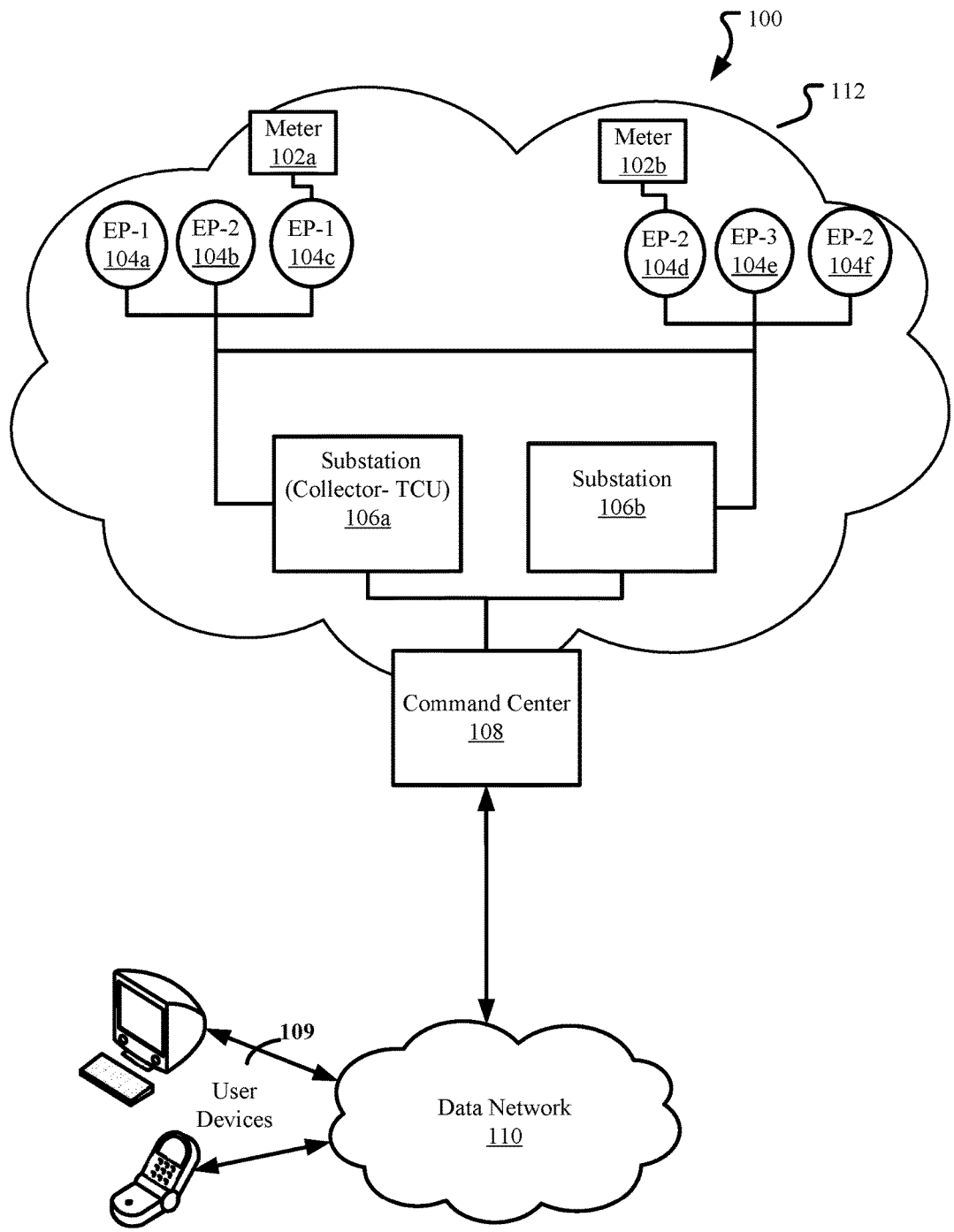
FIG. 1 is a block diagram of an example network environment in which endpoint circuits transmit data, in accordance with one or more embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving delivering data over power-lines using multiple communication schemes in a power-line communication (PLC) network. Transmitter and collector circuitry, in various embodiments, can be used to simultaneously communicate the different data streams corresponding to different communication schemes to endpoint circuits in the PLC network by creating and combining the multiple data streams to form a signal.

Consistent with various embodiments, a plurality of endpoint circuits can be located at homes, buildings and other locations to which electrical power is distributed. The endpoint circuits can be configured to communicate using different communication schemes and over shared power lines. For example, a first subset of endpoint circuits can be configured to communicate using a first communication scheme and are not configured to communicate using a second (or more) communication scheme. A second subset of endpoints can be configured to communicate using the second communication scheme and are not configured to communicate using a third (or first) communication scheme. That is, there is not a single communication scheme that can be used to communicate data to all of the endpoint circuits in the PLC network. This may occur, for example, when an upgrade or a new system is deployed and not all of the endpoint circuits are replaced, upgraded, or updated, or for many others reasons (e.g., multiple entities sharing the same power lines while using different systems).

In certain embodiments, the communication schemes may be different because of different modulation techniques used, for example a frequency-shift keying as opposed to a phase-shift keying technique. For instance, using the above provided example, the first subset of endpoint circuits can use a frequency-shift keying technique and the second subset of endpoint circuits can use a phase-shift keying technique. The different communication schemes may also use different communication channels, where each channel represents the ability to convey information to an endpoint. For example, each channel corresponds to a different carrier frequency, a different time, a different coding, or combinations thereof.

In order to communicate data to the endpoint circuits simultaneously, when there is not a common communication scheme, a separate set of electronics (e.g., separate sets of printed circuit boards (PCBs)) could be used for each communications scheme. It may be desirable to attempt to enclose all of the different electronics into a single enclosure on a power substation. Each set of electronics can be used to inject signals onto a power line in response to data streams formatted according to a particular communication scheme. The use of dedicated PCBs, for example, may consume additional resources, such as power, physical space, and thermal budget. Moreover, a new set of dedicated circuitry will be added for each new future communication scheme.

According to various example embodiments, aspects of the present disclosure are directed toward transmitting multiple data streams, combined into a signal that represents a combination of the data streams and corresponding communication schemes, over power utility lines to endpoint circuits. The various endpoint circuits can be configured to communicate using particular data streams formatted according to different communication schemes. To communicate data from a power substation to the endpoint circuits, a PLC apparatus can generate the multiple different data streams, each data stream being formatted according to a communication scheme that certain endpoint circuits are configured to communicate using. The PLC apparatus can include circuits that are designed to combine the different data streams to form a combined signal. The combined signal can be introduced to the power lines using an injection transformer, and the signal is thereby transmitted over power lines to the endpoint circuits. The use of the combined signal can be particularly useful for simultaneous transmission of the different data streams to the endpoint circuits. As such, embodiments in accordance with the present disclosure can include simultaneous downstream communication of data streams from a power substation to particular endpoint circuits that correspond to different communication schemes.

Particular embodiments are directed toward a system that is designed to inject signals onto the power lines without necessitating specialized circuitry for each communications scheme, including potential future communication schemes that do not yet exist. For instance, a signal processor circuit can be configured to produce an analog version of whatever signals (and corresponding communication scheme) are defined by the data streams. The combination of the signals in the analog realm can then be converted into a control signal (e.g., pulse-based signal) that can be used to control the injection of the combined signal onto one or more power lines.

In accordance with some embodiments, a device and/or system can include a PLC apparatus configured to provide data over a PLC network by transmitting data symbols from a power substation to endpoint circuits (or devices) over a power line using communication channels. The apparatus includes a signal-processing circuit, a pulse-modulation circuit, and an output circuit. The signal-processing circuit combines a plurality of different data streams to form a signal that represents a combination of the data streams and corresponding communication schemes. For example, each of the plurality of different data streams are respectively formatted according to a different communication scheme, which can correspond to a respective set of endpoint circuits. This may occur, for example, when the data streams correspond to different types or versions of PLC communication systems. The data to be sent to the endpoint circuits is what is used to generate the plurality of data streams, and the particular communication scheme for each data stream can correspond to the endpoint circuits' communication capabilities.

As discussed herein, the communication schemes can vary in their different modulation techniques, carrier frequencies, or other encoding properties. The data streams formatted according to a communication scheme can contain (e.g., carry) the modulation technique and the combined signal can retain the modulation technique of each of the different communication schemes. The pulse-modulation circuit converts the signal, as combined by the signal-processing circuit, to a PWM or a PDM signal. The PWM or PDM signal can be used to control switching circuitry that generates an analog signal that is capable of being transmitted over power lines. As discussed herein, the pulse-modulation circuit can switch at a frequency that is sufficiently high so as to preserve the integrity of the different data streams and their different communication schemes. For instance, communication schemes that operate at frequencies of around 300 Hz to 2 KHz might use a pulse-modulation circuit that switches at 10 KHz or more (e.g., at 15 KHz).

Consistent with embodiments, the use of a pulse-modulation circuit can introduce a frequency component at the switching frequency and at harmonics thereof. The output circuit can be configured to filter the switching frequency, and its harmonics, from the PWM or PDM signal and couples the filtered PWM or PDM signal to an injection transformer for presentation to the endpoint circuits. Consistent with embodiments, the system can be designed with use of three phase power, for which each of the three phases can be provided on separate power lines (for ease of discussion, each line is herein referred to as a "phase line"). Consistent with embodiments, the combined signal can be coupled to one or more of the three phase lines of the PLC network. Coupling the same combined signal on more than one phase line can be useful for improving the bit error rate (e.g., where the endpoint devices recover the signal from multiple phase lines to improve signal quality). In certain embodiments, each phase line could be coupled to a different combined signal, which can be useful for increased bandwidth.

As used herein, a utility power line (e.g., electrical lines) can provide power to multiple locations, buildings, and customers. Utility power lines are arranged between consumers of power and power substations associated with a power source generating the power, and configured to provide power to internal electrical lines of the consumers (e.g., within residential and commercial buildings).

Turning now to the figures, FIG. 1 is a block diagram of an example PLC network environment 100 in which endpoint circuits 104*a-f* communicate data with collector circuitries, consistent with embodiments of the present disclosure. The PLC network environment 100 includes a service network 112 in which a plurality of endpoint circuits 104a-104f are coupled (e.g., communicatively coupled) to a PLC device at a power substation 106a-106b. The PLC device at the power substation can include a multi-scheme collector-transmitter device. The network environment 100 includes a service network 112 in which a plurality of endpoint circuits 104a-104f are coupled (e.g., communicatively coupled) to collector circuitry (located at the substations 106a, 106b). Consistent with embodiments of the present disclosure, the endpoints 104 can provide data from utility meters 102a-102b, although other sources of data are equally possible. In some instances, data can be provided from power meters, gas meters and/or water meters, which are respectively installed in gas and water distribution networks. For ease of description the embodiments and examples are sometimes described with reference to endpoints 104 as providing utility data (e.g., power) metering over a power distribution network. However, the embodiments are not so limited and it is understood that other data can also be communicated by endpoint circuits.

In certain embodiments, the endpoints are configured to communicate using different communication schemes. A first subset of endpoints can be configured to communicate using a first communication scheme that a second subset of endpoints might not be designed or capable of using, and the second subset of endpoints can be configured to communicate using the second communication scheme that the first subset of endpoints might not be designed or capable of using. That is, there might not be a common communication scheme that can be used by all of the endpoints. The differences between the different communication schemes can include, but are not necessarily limited to, different modulation techniques and carrier frequencies. In various embodiments, some of the endpoint circuits may be configured to communicate using either of the communication schemes.

For example, FIG. 1 illustrates a subset of endpoints as "EP-1", a subset of endpoints as "EP-2", and a subset of endpoints as "EP-3". EP-1 can be indicative of an endpoint configured to communicate using a first communication scheme and EP-2 can be indicative of an endpoint circuit configured to communicate using a second communication scheme. EP-3 can be indicative of an endpoint configured to communicate using a third communication scheme or an endpoint configured to communicate using both the first and second communication schemes. In embodiments, multiple data streams are combined so that they can each be transmitted from the substation 106a, 106b to the endpoint circuits 104a-f. As used herein, downstream communication can include communication of data from the substation (e.g., from the collector/transmitter) to the endpoint circuits.

In various embodiments, a PLC device provides for data transmission from the power substation 106a, 106b to endpoint circuits over power lines. For example, the power substations 106a, 106b can include PLC devices configured to provide data over a PLC network by transmitting data symbols from the power substation 106a, 106b to endpoint circuits 104 using a data communication channel. A communication channel can be used to convey information and can be at a particular frequency and/or time. Each PLC device includes a signal-processing circuit, a pulse-modulation circuit, and an output circuit.

The signal-processing circuit can combine a plurality of data streams to form a signal. In various embodiments, the plurality of different data streams can be combined by summing. Further, each of the plurality of different data streams can be formatted according to different communication schemes. The combined signal can be a digital signal that represents a combination of the different data streams and corresponds to the different communication schemes.

In various embodiments, the signal-processing circuit can generate each of the plurality of different data streams. For example, the signal-processing circuit can include a digital signal processor (DSP) on a PCB board. In some instances, the PCB board can be designed for insertion and removal from an enclosure that can house multiple PCB boards (or multiple "blades"). The signal-processing circuit can receive data streams from one or more sources. For instance, a computer server can transmit data to the signal-processing circuit over a connection, such as using an Ethernet connection. In various embodiments, the plurality of different data streams are received in a digital form that indicates both the data content and the different communication schemes to be used in transmissions over the power lines (e.g., modulation techniques and/or carrier frequencies). Interface circuitry can link the signal-processing circuit to a pulse-modulation circuit so that the combined data streams can be converted into a PWM or PDM signal.

The pulse-modulation circuit can convert the signal, as combined by the signal-processing circuit, to a PWM or a PDM signal. The pulse-modulation circuity can operate at a switching frequency that is sufficiently high so as to preserve the integrity of the different data streams corresponding to the different communication schemes. As a non-limiting example, for a combination of two communication schemes operating within a frequency range of about 300 Hz to 2000 Hz, it has been discovered that a switching frequency of about 10 KHz, 15 KHz, or more can be sufficient. A switching frequency, as used herein, can include a speed at which the pulse-modulation circuit is a capable of generating pulse signals. Thus, the switching frequency signal can be increased in order to improve the granularity at which pulses can be provided; however, higher switching frequencies can require more costly circuitry and consume additional power.

Consistent with embodiments, PDM can be used to represent an analog signal in a binary digital form. In a PDM encoding, specific amplitude values of the analog signal can be represented by the relative density of binary data pulses. Pulse-width modulation (PWM) is one type of PDM encoding, in which the pulsed width is varied to represent the analog signal in a digital form. The pulses can be evenly spaced in time at a distance corresponding to a encoding/switching frequency. For instance, the amplitude at each sample of an analog signal can be converted to a pulse with a corresponding width. The PDM encoding allows the signal to be easily amplified in a binary form. In some embodiments, the PDM encoded signal may be amplified during the PDM encoding process so that the signal can be used to drive high power switching circuitry.

In some embodiments, the PDM encoding is performed using a Class D amplifier. A Class D amplifier is a switching amplifier, in which the output signal is either fully on or fully off. This characteristic is useful in encoding binary signals, such as in PDM encoding, and significantly reduces the power consumption in comparison to a linear amplifier, which is used for amplification of analog signals. Alternatively, the amplification in some embodiments can include a linear amplification.

The conversion of the combined analog signal into the digital realm can introduce unwanted frequency components to the resulting signal. For a pulse-modulation circuit, at least a portion of these unwanted frequencies can be at, or derived from, the switching frequency. Where the switching frequency is significantly higher than the carrier frequencies, a low-pass (or bandpass) filter can be used to remove these high frequency components from the PDM encoded signal. The filtered signal can then be amplified and provided to the switching circuit where it is injected onto the power lines and thereby converted back to analog.

In certain embodiments, the output circuit can include a filter for removing unwanted frequencies, including the switching frequency from the PWM or PDM signal. The output circuit can also filter the AC frequency of the power distribution lines and prevents high voltage of the power distribution lines from damaging the transmitter circuit (e.g., the switching circuitry, as discussed further herein). That is, the output circuit filters high frequency components of the PWM or PDM encoded signal and uses a switching circuit to produce an amplified version of the filtered signal. Further, the output circuit can couple the filtered PWM or PDM signal to an injection transformer for presentation to communicatively couple the filtered signal from the output circuit to the power lines.

In some embodiments, the signal-processing circuit and the pulse-modulation circuit can be designed in a manner that is neutral to the particular communication scheme being used. For instance, the signal-processing circuit can be configured with sufficient bandwidth to convert various data streams into the analog realm for a variety of different communication schemes that might be used by endpoint circuits. The bandwidth can depend, at least in part, upon the switching frequency and the filtering provided by the system. In certain embodiments, the switching frequency can be adjusted according to the particular communication scheme(s) being used.

Data communication over utility distribution networks (e.g., a PLC network) can be difficult due to the environment of the transmission mediums and the sheer number of endpoint circuits, which contribute to a host of issues including synchronization, communication bandwidth and cost concerns. For example, data transmitters for power lines must be able to handle high voltages inherently present on the power lines. The PLC network environment 100 shown in FIG. 1 may also exhibit dynamic impedance changes which may make communication difficult due to coupling capacitor degradation, addition and removal of other endpoint circuits 104, reconfiguration of the network to balance power loads, reconfiguration of frequency bands assigned to the transmitters, environmental factors, etc. As a result of changes to signal conditions on the power lines, endpoint circuits can have communication circuits (e.g., transmitters) that may dynamically adjust the gain for signals transmitted to the collector.

The signal-processing circuit can also be configured to adjust amplitudes and/or phasing remotely. For example, in response to a control signal, the signal-processing circuit can adjust a duty cycle parameter of the PWM or PDM signal by changing its amplitude. Further, the signal-processing circuit and the pulse-modulation circuit can, in response to a control signal, adjust the duty cycle of the PWM or PDM signal by changing the shape, phase, and/or amplitude.

The endpoints 104 can be implemented to monitor and report various operating characteristics of the service network 112. For example, in a power distribution network, meters 102a-102b can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

When the endpoints 104 are implemented as power meters in a power distribution network, the power meters transmit reporting data that specify updated meter information that can include measures of total power consumption, power consumption over a specified period of time, peak power consumption, instantaneous voltage, peak voltage, minimum voltage and other measures related to power consumption and power management (e.g., load information). Each of the power meters can also transmit other data, such as status data (e.g., operating in a normal operating mode, emergency power mode, or another state such as a recovery state following a power outage).

In FIG. 1, endpoints 104a-104c and 104d-104f transmit data over power lines to a PLC device at the power substation 106a-106b, respectively. Further, the PLC device at the power station can be used to communicate with endpoints using multiple different data streams and corresponding communication schemes. The PLC device can be used to couple filtered PWM or PDM signals that represent a combination of different data streams and corresponding communication schemes, to an injection transformer for presentation to endpoint circuits.

In various embodiments, the PLC device can include a collector and a transmitter (e.g., a transformer coupling unit "TCU"). The collector can include circuitry (e.g., including one or more data processors and/or DSPs) that is configured and arranged to communicate with the endpoint circuits over power lines. The collector can also include circuitry for interfacing with a command center 108 at a local utility office or other location over a utility power line. The interface to the command center 108 can be implemented using a variety of different communication networks including, but not limited to, a wide-area network (WAN) using Ethernet.

According to certain embodiments of the present disclosure, the collectors may be installed in power stations, power substations, transformers, etc. to control bidirectional communication between the command center 108 (e.g., located at a utility office) and endpoints (e.g., located at metering locations for customer sites). This messaging to the endpoints 104 can include the use of messages with addresses that specify an individual endpoint, or broadcast messages that can be addressed to a group of endpoints or even to all endpoints connected to the collectors. Consistent with certain embodiments, the collectors are built according to an industrial-grade computer specification and/or include a plurality of DSP boards and daughter cards in order to withstand the harsh environment of a power substation.

In some embodiments, a collector may take action based on the data received from the endpoints 104 and transmit data received from the endpoints 104 to the command center 108. For example, in a PLC network, the command center 108 can receive data indicating that power usage is significantly higher in a particular portion of a power network than in other portions of the power network. Based on this data, the command center 108 can control the allocation of additional resources to that particular portion of the network (i.e., load balance) or provide data specifying that there is increased power usage in the particular portion of the power network.

Consistent with certain embodiments, the command center 108 provides an interface that allows user devices 109 access to data received by the command center 108 via data network 110. For example, the user devices 109 might be owned by operators of a utility-provider, maintenance personnel and/or customers of the utility provider. For example, data identifying the increased power usage described above can be provided to a user device 109, which can, in turn, determine an appropriate action regarding the increased usage. Additionally, data identifying a time-of-use measure and/or a peak demand measure can also be provided to the user devices 109. Similarly, if there has been a power outage, the command center 108 can provide data to user devices 109 that are accessible by customers to provide information regarding the existence of the outage and potentially provide information estimating the duration of the outage.

The data network 110 can be a wide area network (WAN), local area network (LAN), the Internet, or other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks.

Endpoints 104 can include communication circuits configured to transmit data to collectors over a power line and the PLC network. For example, the communication circuit can transmit data to collectors using different communication channels and/or different modulation techniques. For example, the PLC network can use a modulation technique such as frequency shift keying (FSK), phase shift keying (PSK, e.g., Quadrature PSK or 8PSK), multiple tone frequency shift keying (MTFSK, e.g., 2 of 9, or 2 of 46 MTFSK), Quadrature Amplitude Modulation (QAM, e.g., 16 or 256 QAM), etc. A particular data modulation technique that is discussed herein is multi-tone frequency shift keying (MTFSK). Encoded data symbols from a particular endpoint may be transmitted over one of thousands of communications channels in a PLC system. Communication channels may be allocated from various portions of spectrum over which data are transmitted. Each channel can be further allocated into sub-channels. The center frequency and bandwidth of each communications channel can depend on the communications system in which they are implemented. In some implementations, multiple communication channels may use time slots to operate in one or more shared frequency bands. For example, each endpoint can be assigned a particular channel according to an orthogonal frequency division multiple access (OFDMA) or another channel allocation technique.

To communicate with particular endpoint circuits, the signal-processing circuit of the PLC device can create a plurality of different data streams in a digital form. The different data streams, as previously discussed, can respectively be formatted according to different communication schemes used for conveying the data symbols to certain of the endpoint circuits. The different communication schemes of the different data streams can include different modulation techniques. For example, the different communication schemes can include, but are not limited to, a frequency-shift keying, a first type of phase-shift keying, another different type of phase-shift keying, and amplitude-shift keying, binary phase-shift keying, quadrature phase-shift keying, spread spectrum, and quadrature amplitude modulation.

Consistent with embodiments of the present disclosure, a collector can be configured to be in communication with thousands of endpoints 104, and thousands of collectors can be in connection with the command center 108. For example, a single collector can be configured to communicate with over 100,000 endpoints and a command center can be configured to communicate with over 1,000 collectors. Thus, there can be millions of total endpoints and many thousands of endpoints can communicate to the same collector over a shared power distribution line. Accordingly, embodiments of the present disclosure are directed toward communication protocols that are designed for use in this demanding context.

The endpoints 104 can provide data (e.g., power-meter reports and initiation requests) over a PLC network by transmitting data symbols over a power line using a data communication channel. Each endpoint circuit (e.g., the endpoint 104a) can include a metering circuit, a communication circuit and a processing circuit. The metering circuit can receive or generate utility-meter data (e.g., power-meter data) for utility-supplied alternating current (AC) power that is provided over the power line that is part of the PLC network. The metering circuit provides a communication path between a utility meter and the processing circuit. For example, the metering circuit can communicate with the utility meter 102 (and/or the processing circuit) using wireless or wired communications. The utility-meter data can include monitored characteristics related to power usage in the network including, e.g., average or total power consumption, power surges, power drops and load changes, among other characteristics. In gas and water distribution networks, meters can measure similar characteristics that are related to gas and water usage (e.g., total flow and pressure). Each of the meters can also transmit other data, such as status data (e.g., operating in a normal operating mode, emergency power mode, or another state such as a recovery state following a power outage).

The communication circuit of the endpoints 104 can transmit the utility-meter data over the power line and the PLC network. For example, the communication circuit can transmit the power-meter data to the collector circuitry over the power line and that is formatted according to a communication scheme.

Figure 2:
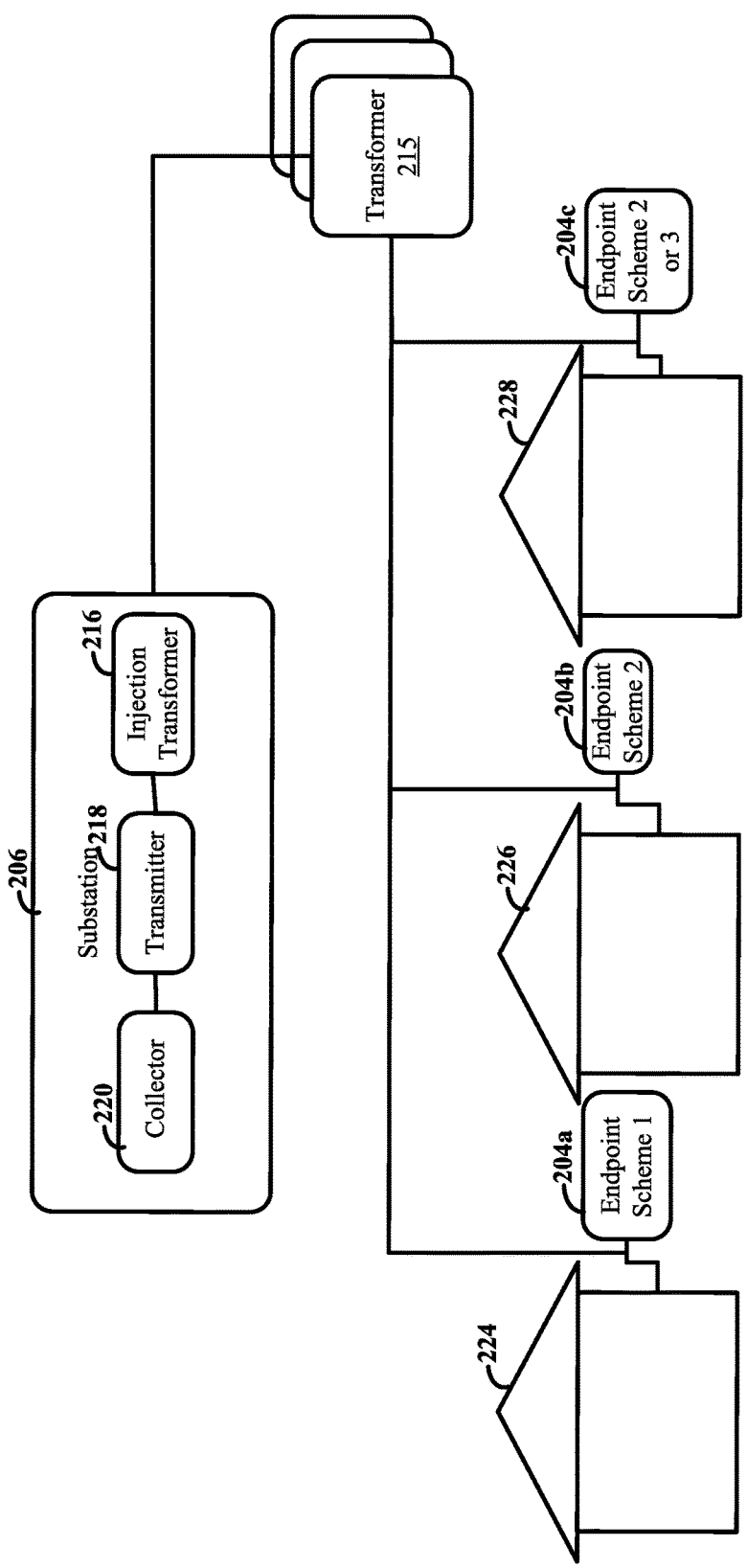
FIG. 2 depicts a system in which a plurality of endpoint circuits are located at different locations, in accordance with one or more embodiments of the present disclosure.

FIG. 2 depicts a system in which multiple endpoint circuits are located at different locations, in accordance with one or more embodiments of the present disclosure. Endpoint circuits 204a, 204b, and 204c are each located at a different location (customer premises) 224, 226 and 228, respectively. Each endpoint circuit 204a, 204b, and 204c can communicate with one or more collector circuits 220. As illustrated by FIG. 2, in various embodiments, the communication can include different modulation schemes. Complicating this communication is the potential for one or more transformers 215 to be located between the endpoints 204a, 204b, and 204c and the collector 220. Moreover, many thousands of endpoints 204a, 204b, and 204c can communicate with a single collector 220 and therefore the data bandwidth requirements can be significant even without large amounts of data being transmitted from each endpoint.

In certain embodiments, one or more collectors 220 can be located at a power substation 206. From the substation 206, power distribution lines are routed to different locations, including various customer premises. In some instances, additional transformer(s) 215 can step down voltage of the provided power for local delivery to such premises.

Figure 5:
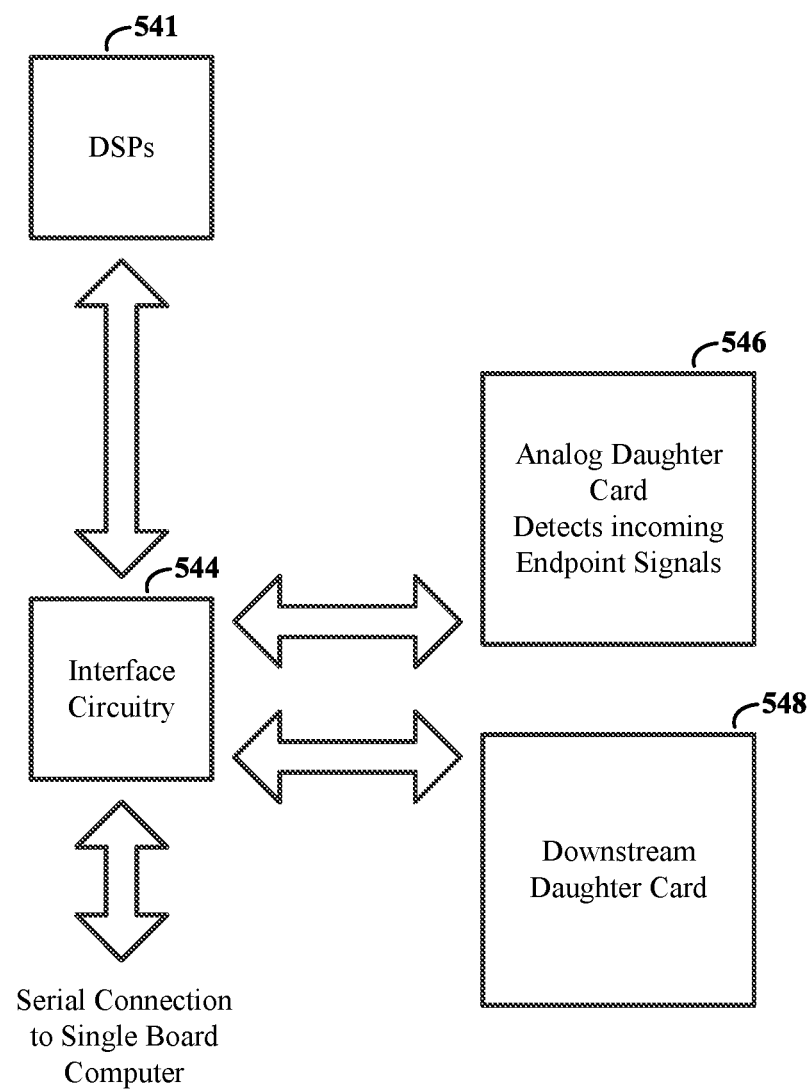
FIG. 5 is a block diagram of an example DSP board, in accordance with one or more embodiments of the present disclosure.

As illustrated by FIG. 2, a transmitter 218 and an injection transformer 216 are further located at the power substation 206. Although the embodiment of FIG. 2 illustrates the transmitter 218 and the collector 220 as separate boxes, in accordance with various embodiments a PLC device can include both the transmitter 218 and the collector 220. For example, the PLC device can include a signal-processing circuit, a pulse-modulation circuit, and an output circuit. The collector circuitry 220, in various embodiments, can be at least one DSP board, as illustrated by FIG. 5. The DSP board can include the signal-processing circuit and a daughter card. The daughter card, for example, can include the pulse-modulation circuit. The transmitter circuitry 218 can include an output circuit that includes switching circuitry (e.g., high power switches that might include IGBTs or power MOSFETS).

The injection transformer 216 can include circuitry configured and arranged to couple the transmitter 218 (e.g., TCU) to the power lines. The transformer 215 can include circuitry configured and arranged to provide power to residential and/or commercial buildings. Although the injection transformer 216 is illustrated as separate circuitry, in various embodiments, the injection transformer 216 can include a component of the transmitter 218.

Figure 3:
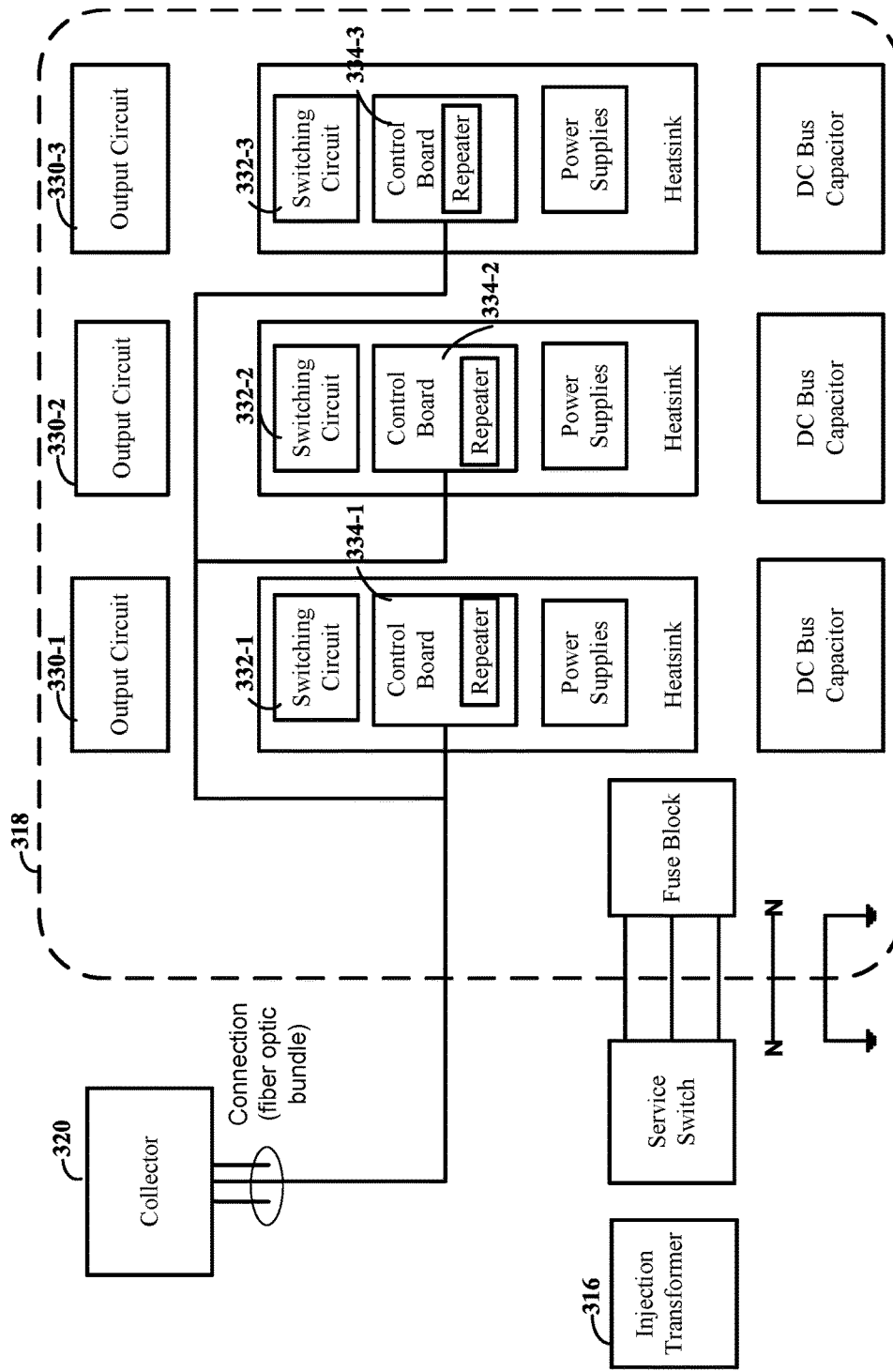
FIG. 3 is a block diagram of an example power substation with a PLC device, in accordance with one or more embodiments of the present disclosure.

FIG. 3 is a block diagram of an example power substation with a PLC device, in accordance with one or more embodiments of the present disclosure. As illustrated by FIG. 1, the substation can include a collector 320, an injection transformer 316, and a transmitter 318, in various embodiments.

The collector 320 can include a signal-processor circuit and a pulse-modulation circuit. For example, the signal-processor circuit can receive a plurality of different data streams (in digital form) to be transmitted to endpoint circuits and combine the plurality of different data streams to form a signal that represents each of the data streams and their corresponding communication schemes. In certain embodiments, the combined signal can be converted to the analog realm using a digital-to-analog converter (DAC). The combined signal can be converted by the pulse-modulation circuit to a PWM or PDM signal.

According to embodiments, the combination of different signals and the analog to digital conversion processing can introduce unwanted frequencies to the combined signal. This can include frequency components that are higher than the carrier frequency of the different communication schemes, partly due to the switching frequency of the pulse-modulation circuit. The transmitter 318 can include an output circuit 330-1, 330-2, 330-3 that includes one or more filters designed to attenuate unwanted frequencies, such as the switching frequency. This can include, for example, a low-pass filter, a band-pass filter, a notch filter, and combinations thereof. The output circuit 330 can also be configured to provide the filtered PWM or PDM signal to the injection transformer 316.

In various embodiments, the transmitter 318 further includes at least one control board 334-1, 334-2, 334-3, at least one switching circuit 332-1, 332-2, 332-3, and at least one output circuit 330-1, 330-2, 330-3 coupled to the injection transformer 316. Each control board 334 can include processor circuitry configured to provide control functions for the switching circuits 332. Each switching circuit 332 can be configured and arranged to receive pulse signals from the collector 320. For example, the pulse signals from the pulse-modulation circuit can be used to drive the switching circuits 332. Example switching circuits can use an Insulated-Gate Bipolar Transistor (IGBT) based "H-bridge", a metal-oxide-semiconductor field-effect transistor (MOSFET), or other suitable high-power switches. The collector 320 can be connected, such as with fiber optic connections, to the control boards 334 to drive the switching circuits 332. The injection transformer 316 is used to couple the transmitter 318 outputs onto power lines.

In a number of embodiments, the transmitter 318 can include power supplies and/or repeaters. The power supplies can provide different voltage levels for different types of circuits, such as the switching circuits and output circuits. In some embodiments, a separate connection (e.g., fiber optic connection) from the collector 320 can go to each of the control boards 334. For instance, three separate fiber optic lines can be used to send data to a respective control board. The fiber optic lines can be physically grouped into a fiber optic bundle, or separately routed to the control boards. Alternatively, the connection, such as a fiber optic connection, from the collector 320 can go to one control board (e.g., control board 334-1), and the respective control board can include a repeater. The repeater can repeat the signal received by the control board and send the signal to the next control board (e.g., control board 334-2) in the chain. Similarly, the next control board can include a repeater configured to repeat the signal received from the control board and send to the next control board (e.g., control board 334-3).

As discussed herein, three phase power can be used in which there are three corresponding and different phase lines. According to embodiments, transmitter 318 can be configured to include up to three control boards 334-1, 334-2, 334-3, three switching circuits 332-1, 332-2, 332-3, and three output circuits 330-1, 330-2, 330-3 coupled to the injection transformer 316 to allow for transmission of signals on each of the three phases lines. For example, the transmitter 318 can couple the data symbols by presenting a filtered PWM or PDM signal to at least one of the three phase lines via the injection transformer 316. In various embodiments, the filtered PWM or PDM signal can be identically presented to all three phase lines. In certain embodiments, each phase line can be used to transmit different data.

The filter of the output circuit 330 can allow for efficient transmission of downstream signals, filtering of the switching frequency (e.g., the high frequency components), and can include isolation circuitry that can prevent the AC power line voltage from overwhelming the switching circuits 332. In various embodiments, the filter of the output circuits 330 include a band-pass filter. A band-pass filter, as used herein, restricts the spectral components that are transmitted to the endpoints to those spectral components that are included in the "pass-band" of the filter (e.g., as defined by an upper cutoff frequency ("fu") and a lower cutoff frequency ("fl")). For example, the band-pass filter in some embodiments can allow for transmission of signals between 300 (Hertz) Hz to 2000 Hz. In various embodiments, the signal-processing circuit and the pulse-modulation circuit provide linear amplification of the plurality of different data streams (e.g., the combined signal) with a threshold not less than a minimum power level across a bandwidth range of between 300 Hz. to 2000 Hz.

Consistent with embodiments, the system can be configured to allow for the transmitted signal to be properly coupled through the injection transformer 316 to the endpoints with little or no tuning to the collector and transmitter circuits (whether in assembly or in the field).

In accordance with various embodiments, the transmitter 318 can include additional and/or fewer elements and/or components than illustrated by FIG. 3. For example, the transmitter can include disabling circuitry. The disabling circuitry can disable the transmitter 318 in response to at least one of a loss of the PWM or PDM signal from the pulse-modulation circuit and detection of a temperature over a threshold degree.

Figure 4:
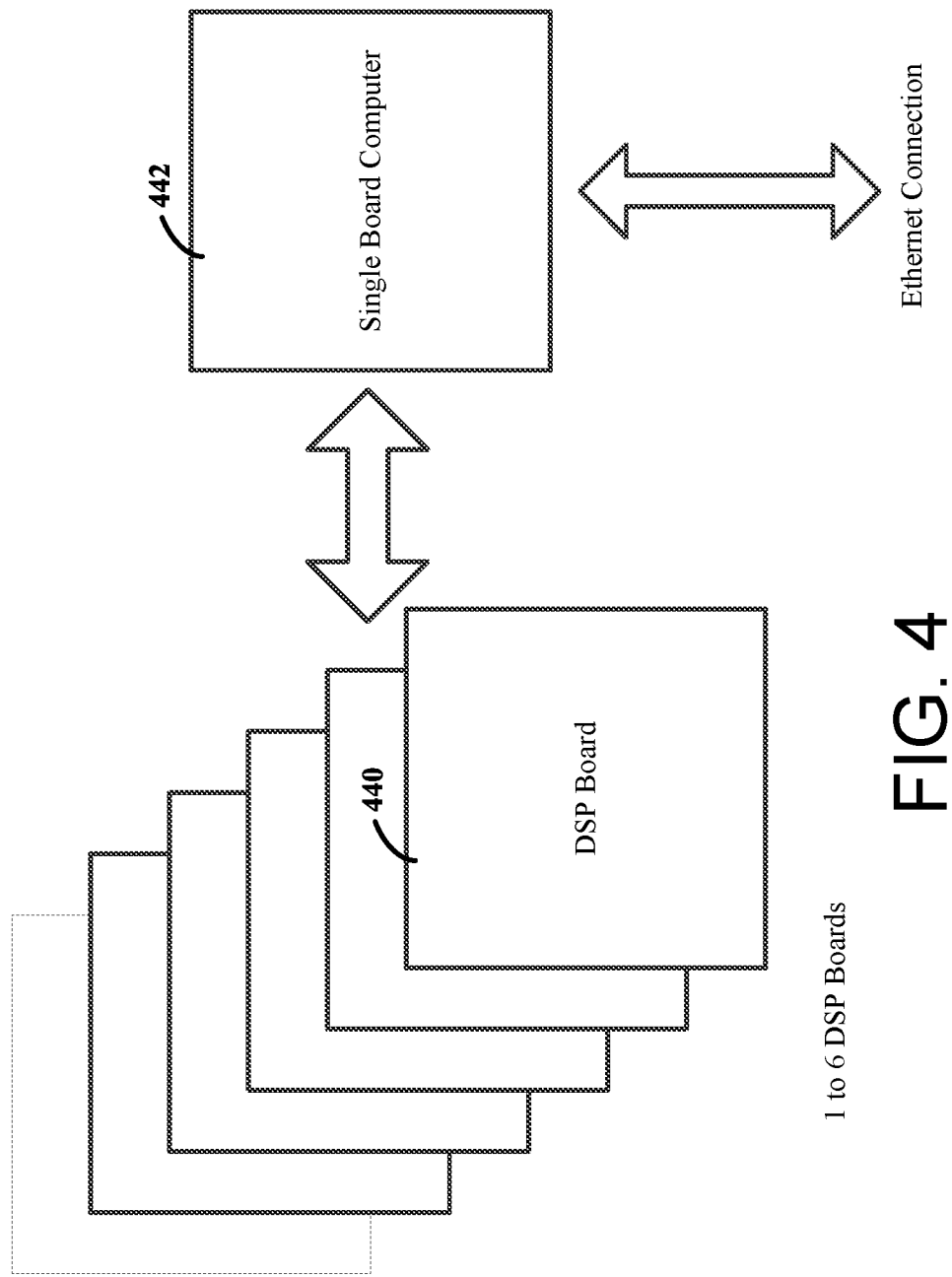
FIG. 4 is a block diagram of an example collector circuitry, in accordance with one or more embodiments of the present disclosure.

FIG. 4 is a block diagram of an example collector circuitry of a multi-scheme PLC device, in accordance with one or more embodiments of the present disclosure. As previously discussed, the collector circuitry can be one or more DSP boards 440 and can include a signal-processing circuit. In various embodiments, the signal-processing circuit can include at least one DSP on the DSP board 440. In a number of embodiments, multiple DSP boards 440 can be located at a power substation (e.g., each board being a separate blade within a common enclosure) and connected to a single board computer 442. The collector circuitry can further include a suitable (e.g., Ethernet) connection to the DSP boards. Data that corresponds to the data streams generated by the signal-processing circuit can be received using the Ethernet connection. The signal-processing circuit generates the plurality of different data streams in a digital form using the data received (and based on the different communication schemes) and combines the plurality of different data streams to form a signal.

FIG. 5 is a block diagram of an example DSP board, in accordance with one or more embodiments of the present disclosure. As illustrated by FIG. 4, in various embodiments, the DSP board can include one or more DSPs 541. Further, in various embodiments, the pulse-modulation circuit, can be located on a downstream daughter card 548 of the DSP boards. The daughter card can be a separate PCB board that is connected to the DSP boards through electrical and physical connector(s). The use of a separate daughter board can be particularly useful for providing additional board space and for allowing for replacement or upgrades of daughter boards separately from the base/control board.

In accordance with a number of embodiments, the DPS board can include interface circuitry 544. The interface circuitry 544 can be configured to handle communications between the DSPs 541, the downstream daughter card 548, and the single board computer. Further, in various embodiments, the DSP board can include another (analog) daughter card 546. For example, the analog daughter card 546 can include an analog circuit configured to detect incoming signals (e.g., data symbols) from the endpoint circuits. The interface circuitry 544 can connect the analog daughter card 546 to the DSPs 541 and/or the single board computer.

Figure 6:
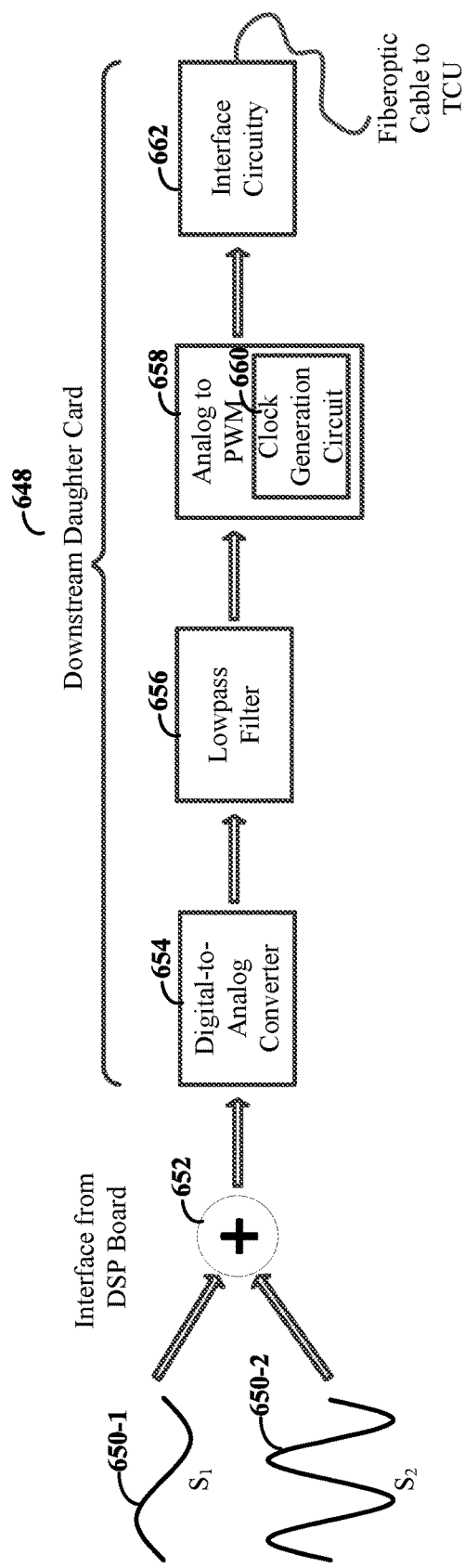
FIG. 6 is a flow diagram illustrating combining multiple different data streams to form a signal and modulating the signal in accordance with one or more embodiments of the present disclosure.

FIG. 6 is a flow diagram illustrating combining multiple different data streams to form a signal and modulating the signal in a PLC network, in accordance with one or more embodiments of the present disclosure. A signal-processing circuit can generate (e.g., create) a plurality of different data streams 650-1, 650-2. For example, using data received, the signal-processing circuit creates the different data streams in a digital form based on the different communication schemes. The plurality of different data streams 650-1, 650-2 can be for particular endpoint circuits that are configured to communicate using different communication schemes. For example, each of the plurality of different data streams 650-1, 650-2 can be formatted according to the different communication schemes used for conveying data symbols to certain of the endpoint circuits. As illustrated by FIG. 6, the different data streams 650-1, 650-2 can correspond to different communication schemes having different carrier frequencies.

The plurality of different data streams 650-1, 650-2 can be combined at 652, such as by summing, using the signal-processing circuit and transmitted to a pulse-modulation circuit via an interface circuit. In various embodiments, a DSP board can include the signal-processing circuit and a downstream daughter card 648 of the DSP board can include the pulse-modulation circuit.

The pulse-modulation circuit, in some embodiments, includes a digital-to-analog converter (DAC) 654, a low pass filter 656, an analog-to-PWM converter 658, and interface circuitry 662 (e.g., fiber optic transmitter). For example, using the interface circuit from the DSP board, the combined signals 652 are transmitted to the downstream daughter card 648 of the DSP board.

The DAC 654 converts the input combined signal 652 from the signal-processing circuit (e.g., the DSP board) to analog signals. The low pass filter 656 filters the analog signals and provides the filtered signal to the analog to PWM converter 658. For example, when data streams are combined, such as data streams having different carrier frequencies, the combined signal can have unwanted (e.g., high) frequencies that will not be used by the endpoint circuits and that may, for example, cause interference with wireless devices near the power lines. The low pass filter can filter the unwanted frequencies out from the combined signal. The analog to PWM converter 658 converts the analog filter signals, as combined by the signal-processing circuit, to a PWM or PDM signal, as previously discussed. As illustrated, the pulse-modulation circuit, in various embodiments, includes a clock generation circuit 660. The clock generation circuit 660 generates a timing signal corresponding to the switching frequency.

The interface circuitry 662 of the daughter card 648 couples the output of the daughter card 648 to the transmitter (e.g., the TCU). As illustrated, in various embodiments, the interface circuitry 662 of the daughter card 648 includes a cable, such as a fiberoptic cable. In various embodiments, the PWM or PDM signal is transmitted as a fiber optic signal to the transmitter.

Figure 7:
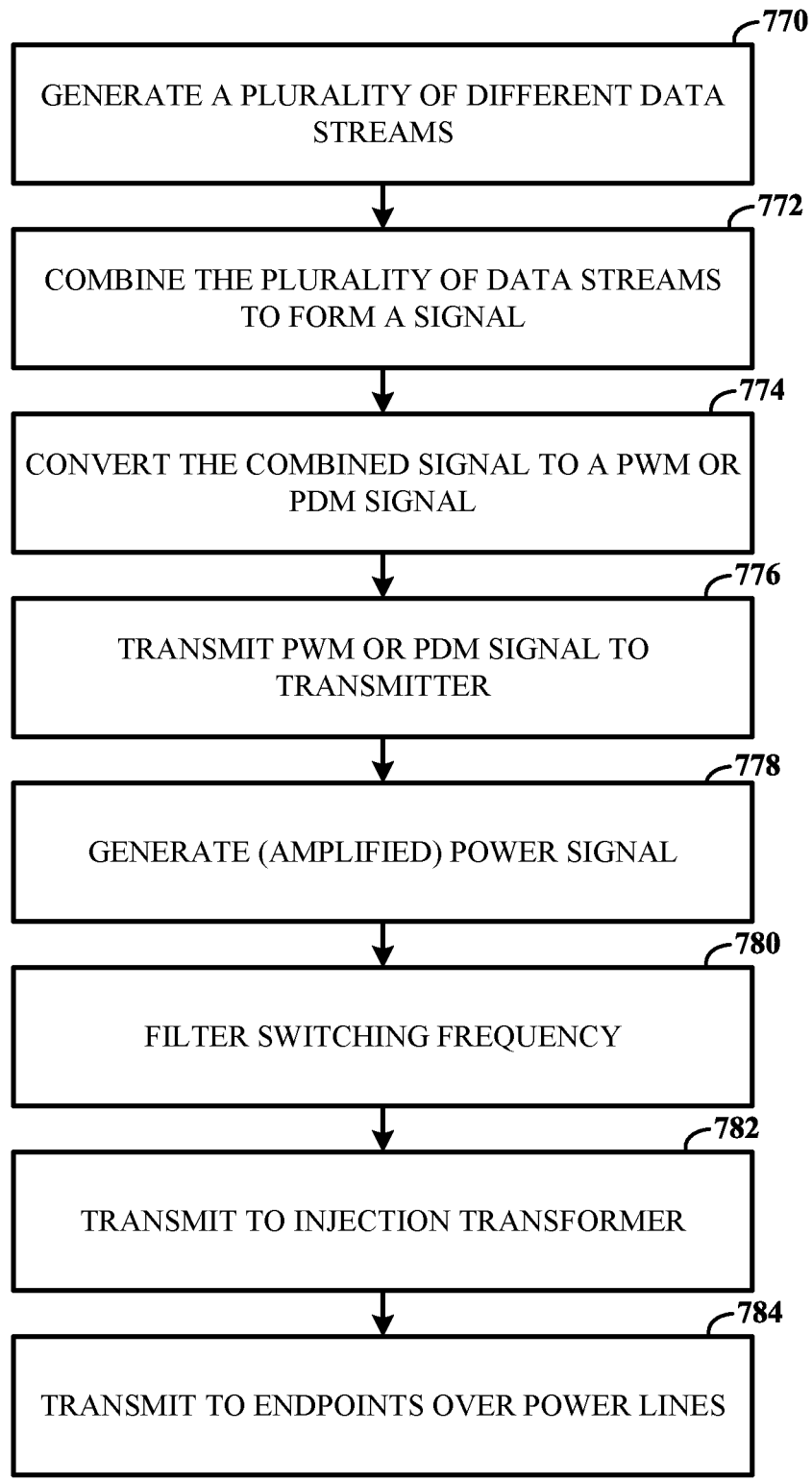
FIG. 7 is a flow diagram illustrating a process of providing data over a power-line communication network in accordance with one or more embodiments of the present disclosure.

FIG. 7 is a flow diagram illustrating a process of providing data over a power-line communication network in accordance with one or more embodiments of the present disclosure. The process can be used, for example, to simultaneously provide data over power-lines using multiple different data streams and corresponding communication schemes.

At block 770, the process includes generating a plurality of different data streams in a digital form. Each of the plurality of digital data streams is formatted according to a different communication scheme used for conveying the data symbols to certain endpoint circuits. The plurality of different data streams, at block 772, are combined to form a signal that represents the combination of the data streams and corresponding communication schemes. The plurality of different data streams can be combined by summing, for example. Further, the signal, as combined, is transmitted to a pulse-modulation circuit. A signal-processing circuit can generate and combine the plurality of data streams and an interface circuit of the signal-processing circuit can couple the signal-processing circuit to the pulse-modulation circuit for transmission of the signal.

At block 774, the process includes converting the signal, as combined, as a PWM or PDM signal using the pulse-modulation circuit. The pulse-modulation circuit can switch at a frequency of at least 10 KHz, or at least 15 KHz, and more than the carrier frequency of the plurality of different communication schemes. The switching frequency, in accordance with various embodiments, can result in frequency components in the PMW or PDM signal that are above the carrier frequency of the different communication schemes (e.g., high frequency components that correspond with the switching frequency). At block 776, the process includes transmitting the PWM or PDM signal to the transmitter (e.g., using a connection between the collector circuitry and the transmitter). At block 778, a power signal, for transmission on a power line, can be generated using the transmitter.

At block 780, the process includes filtering the switching frequency from the PWM or PDM signal using a band-pass filter. An output circuit can include the band-pass filter and can be used to filter the switching frequency and couple the filtered signal to an injection transformer.

At block 782, the process includes transmitting the filtered PWM or PDM signal to one of three phase lines via an injection transformer for presentation to endpoint circuits. Further, at block 784, the filtered PWM or PDM signal can be transmitted over power lines to endpoint circuits using the injection transformer.

Various blocks, modules or other circuits may be implemented to carry out one or more of the operations and activities described herein and/or shown in the figures. In these contexts, a "block" (also sometimes "circuit", "logic circuitry" or "module") is a circuit that carries out one or more of these or related operations/activities (e.g., combine a plurality of different signals, convey the signals as a PWM or PDM signal, or filter the switching frequency). For example, in certain of the above-discussed embodiments, one or more modules are discrete logic circuits or programmable logic circuits configured and arranged for implementing these operations/activities, as in the circuit modules shown in FIGS. 3-6. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

The various embodiments described above are provided by way of illustration only and should not be construed to limit the invention. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features of another figure even though the combination is not explicitly shown or explicitly described as a combination. It is intended that the specification and illustrated embodiments be considered as examples only, with a true scope of the invention being indicated by the following claims.

What is claimed is:

1. An apparatus comprising:
    circuitry configured and arranged to convey information by
        combining a plurality of different data streams, each of the plurality of different data streams respectively formatted according to different communication schemes used for conveying data symbols to certain endpoint circuits of a power-line communication network, to form a signal that represents a combination of the different data streams and corresponding communication schemes; and
        converting the formed signal to a modulated signal that is modulated by modifying pulses of the formed signal, the pulse-modulation circuit configured and arranged to switch at a frequency which preserves integrity of the information by preserving the different data streams and their different communication schemes; and
    a filter configured and arranged to filter the switching frequency from the modulated signal, whereby the apparatus couples the modulated signal, as filtered, to an injection transformer for presentation to the endpoint circuits.

2. The apparatus of claim 1, wherein the frequency that preserves integrity of the information is higher than a carrier frequency associated with at least one of the different data streams.

3. The apparatus of claim 1, wherein the circuitry is further configured and arranged to adjust a duty cycle parameter of the modulated signal by a change of at least one of: its shape, phase, and amplitude.

4. The apparatus of claim 1, further including other circuitry configured and arranged to couple the modulated signal, as filtered, by presentation thereof to at least one of three phase lines via the injection transformer, and wherein the modulated signal is a pulse-width modulated or a pulse-density modulated signal, and the frequency that preserves integrity of the information is at least 10 kilohertz.

5. The apparatus of claim 1, wherein the circuitry is further configured and arranged to provide linear amplification of the plurality of different data streams so that not less than a minimum power level manifests across a bandwidth range of between 300 Hz to 2000 Hz.

6. The apparatus of claim 1, wherein the circuitry is further configured and arranged to adjust, in response to a control signal, a duty cycle of the modulated signal by changing shape and/or amplitude.

7. The apparatus of claim 1, wherein the different communication schemes, of the plurality of different data streams, include at least two selected from the following list: frequency-shift keying; a first type of phase-shift keying; another different type of phase-shift keying; and amplitude-shift keying.

8. The apparatus of claim 1, wherein at least two of the different communication schemes correspond to schemes in the following list: frequency-shift keying; phase-shift keying; binary phase-shift keying; and quadrature phase-shift keying.

9. The apparatus of claim 1, wherein at least one of the different communication schemes corresponds to one of the following: frequency-shift or phase-shift keying; on-off keying; spread spectrum; and quadrature amplitude modulation.

10. The apparatus of claim 1, further including an output circuit coupled to the filter and configured and arranged to transmit the different data streams corresponding to the different communication schemes simultaneously.

11. The apparatus of claim 1, wherein the circuitry is further configured and arranged to combine the plurality of different data streams by summing the plurality of different data streams.

12. The apparatus of claim 1, wherein the circuitry is further configured and arranged to combine the plurality of different data streams by combining aspects of the plurality of different data streams.

13. The apparatus of claim 1, wherein the circuitry is further configured and arranged to convert the formed signal as a pulse-width modulated (PWM) or a pulse-density modulated (PDM) signal, and wherein the pulse-modulation circuit is configured and arranged to switch at a frequency of not less than 10 kilohertz (KHz) and more than a carrier frequency of each of the plurality of different data streams.

14. The apparatus of claim 1, further including the injection transformer.

15. The apparatus of claim 1, further including the injection transformer and also the certain endpoint circuits of the power-line communication network.

16. The apparatus of claim 1, further including:
   an output circuit configured and arranged to filter the switching frequency from a PWM or a PDM signal and to couple the filtered PWM or PDM signal to an injection transformer for presentation to the endpoint circuits; and
   the injection transformer configured and arranged to couple the filtered PWM or PDM signal to power lines for delivery to the endpoint circuits.

17. The apparatus of claim 16, further including transmitter circuitry wherein the output circuit is coupled to the transmitter circuitry, and wherein the transmitter circuitry further includes circuitry configured and arranged to disable the transmitter in response to at least one of:
   loss of the PWM or PDM signal from the pulse-modulation circuit; and
   a detection of temperature over a threshold degree.

18. The apparatus of claim 16, further including a clock generation circuit configured and arranged to generate a timing signal corresponding to, and used to provide, the switching frequency.

19. A method for providing information over a power-line communication network by transmitting data symbols to endpoint circuits over power lines using a data communication channel, the method including:
   combining a plurality of different data streams to form a signal ("formed signal") that represents a combination of the different data streams and corresponding communication schemes, each of the plurality of different data streams respectively formatted according to different communication schemes used for conveying data symbols to certain of the endpoint circuits, and each of the plurality of different data streams respectively corresponding to different carrier frequencies;
   converting the formed signal to a modulated signal using a modulation circuit configured and arranged to switch at a frequency which preserves integrity of the information by preserving the different data streams and their different communication schemes and more than the different carrier frequencies;
   filtering the switching frequency from the modulated signal and transmitting the filtered signal to at least one of three phase lines via an injection transformer for presentation to the endpoint circuits; and
   transmitting, using the injection transformer, the filtered signal to the endpoint circuits over power lines.

* * * * *